US011547241B1

(12) United States Patent
Tasker

(10) Patent No.: US 11,547,241 B1
(45) Date of Patent: Jan. 10, 2023

(54) SKEWER HOLDER

(71) Applicant: Shiv Tasker, Weston, MA (US)

(72) Inventor: Shiv Tasker, Weston, MA (US)

( * ) Notice: Subject to any disclaimer, the term of this patent is extended or adjusted under 35 U.S.C. 154(b) by 198 days.

(21) Appl. No.: 16/214,448

(22) Filed: Dec. 10, 2018

Related U.S. Application Data

(63) Continuation of application No. 14/488,180, filed on Sep. 16, 2014, now Pat. No. 10,149,571.

(60) Provisional application No. 61/878,698, filed on Sep. 17, 2013.

(51) Int. Cl.
*A47J 43/18* (2006.01)
*A47J 37/04* (2006.01)

(52) U.S. Cl.
CPC ......... *A47J 37/049* (2013.01); *A23V 2002/00* (2013.01)

(58) Field of Classification Search
CPC .. A47J 37/041; A47J 37/0694; A47J 37/0688; A47J 37/06; A47J 37/07; A47J 37/049; A23V 2002/00
USPC ........... 99/419, 421 HV, 359, 449, 441, 450, 99/421 HH, 421 H, 421 A, 421 R; 211/74, 125, 14, 71.01; 126/25 A, 25 R
See application file for complete search history.

(56) References Cited

U.S. PATENT DOCUMENTS

| | | | |
|---|---|---|---|
| 1,188,146 A * | 6/1916 | Bogley | A47B 73/00 211/74 |
| 1,634,953 A * | 7/1927 | McCune | B64D 1/02 211/13.1 |
| 2,854,147 A * | 9/1958 | Derr | A01K 97/08 211/70.8 |
| 2,910,930 A * | 11/1959 | Hankoff | A47J 37/0704 99/421 R |
| 3,017,819 A * | 1/1962 | Manteris | A47J 37/0745 99/421 HH |
| 3,126,814 A * | 3/1964 | Brown | A47J 37/041 99/421 H |

(Continued)

OTHER PUBLICATIONS

Skewer Stand—Restaurantware. [online]. Amazon-Visit the BambooMN Store [retrieved Feb. 24, 1998]. Retrieved from the Internet: <URL: https://www.amazon.com/Skewer-Stand-Food-Pick-Restaurantware/dp/B01CZD8H54>. (Year: 2016).*

(Continued)

*Primary Examiner* — Jimmy Chou
(74) *Attorney, Agent, or Firm* — Loginov & Associates, PLLC; William A. Loginov

(57) ABSTRACT

A holder for skewers is comprised of an upper array and a lower array of eyelets for receiving and retaining skewer shafts, a plurality of legs for supporting the upper and lower eyelet arrays and a plurality of support members for those arrays. Each of the upper and lower arrays can retain at least one skewer. The retained skewers are retained in an elevated orientation of approximately 60 degrees relative to the horizontal plane. The skewer holder is provided with at least three legs and can be constructed of wire. Alternatively, the skewer holder is provided with an upper circular thin plate, a lower circular thin plate and a plurality of legs. Through-holes in the upper and lower circular plates serve as eyelets for a skewer. The upper circular thin plate is wider than the lower plate. The retained skewers are retained in an elevated orientation of approximately 60 degrees.

10 Claims, 11 Drawing Sheets

(56) References Cited

U.S. PATENT DOCUMENTS

| | | | | |
|---|---|---|---|---|
| 3,169,470 | A * | 2/1965 | Oatley | A47J 37/041 99/421 R |
| 3,196,776 | A * | 7/1965 | Norton | A47J 37/042 99/421 P |
| 3,203,748 | A * | 8/1965 | Toms | B42F 17/28 312/249.6 |
| 3,217,635 | A * | 11/1965 | Scavullo | A47J 43/283 99/419 |
| 3,221,638 | A * | 12/1965 | Wickenberg | A47J 37/043 99/340 |
| 3,309,982 | A * | 3/1967 | Surks | A47J 37/04 99/420 |
| 3,381,606 | A * | 5/1968 | Kodey | A47J 37/0772 99/421 HV |
| 3,527,155 | A * | 9/1970 | Renn | A47J 37/049 99/421 H |
| 3,590,726 | A * | 7/1971 | Warner | A47J 37/0704 99/339 |
| 3,643,812 | A * | 2/1972 | Mander | B65D 25/108 211/74 |
| 3,848,523 | A * | 11/1974 | Galisz | A47J 37/0745 99/421 H |
| 3,939,761 | A * | 2/1976 | McGinty | A47J 37/041 99/421 H |
| 3,952,644 | A * | 4/1976 | Wales | A47J 37/00 99/419 |
| 3,956,979 | A * | 5/1976 | Coroneos | A47J 37/043 99/421 V |
| 3,965,810 | A * | 6/1976 | Miller | A47J 43/26 99/581 |
| 4,076,116 | A * | 2/1978 | Sowders | A47F 3/0486 206/486 |
| 4,284,603 | A * | 8/1981 | Korom | B01L 9/06 210/323.1 |
| D265,126 | S * | 6/1982 | Beall | D24/230 |
| 4,366,750 | A * | 1/1983 | Brown | A47J 37/043 99/421 P |
| 4,372,199 | A * | 2/1983 | Brown | A47J 37/043 403/334 |
| 4,446,776 | A * | 5/1984 | Gelfman | A47J 37/10 99/401 |
| 4,483,241 | A * | 11/1984 | Vaughn | A47J 37/041 126/27 |
| 4,589,333 | A * | 5/1986 | Murphy | A47J 37/0688 D7/331 |
| 4,593,613 | A * | 6/1986 | Waltman | A47J 37/041 99/449 |
| 4,657,147 | A * | 4/1987 | Le Mer | B42F 17/28 211/131.1 |
| 4,688,685 | A * | 8/1987 | Brace | A63C 11/028 211/60.1 |
| 4,724,753 | A * | 2/1988 | Neyman | A47J 37/0763 126/25 A |
| 4,887,523 | A * | 12/1989 | Murphy | A47J 37/00 99/419 |
| 4,944,219 | A * | 7/1990 | Hambright | A47J 43/26 99/581 |
| 5,007,403 | A * | 4/1991 | Chen | A47J 37/0704 126/25 AA |
| 5,074,421 | A * | 12/1991 | Coulter | A47F 5/02 211/78 |
| 5,101,715 | A * | 4/1992 | Liu | A47J 37/043 126/41 A |
| 5,160,101 | A * | 11/1992 | Ferraro | B64D 1/02 211/163 |
| 5,193,443 | A * | 3/1993 | Carney | A47J 37/0694 211/125 |
| D352,870 | S * | 11/1994 | Eriksen | D6/680.2 |
| 5,359,988 | A * | 11/1994 | Hait | A47J 37/0704 126/153 |
| 5,458,054 | A * | 10/1995 | Yu | A47J 37/0704 126/25 A |
| 5,518,127 | A * | 5/1996 | Warmack | A47F 9/00 108/25 |
| 5,575,196 | A * | 11/1996 | Masel | A47J 37/043 99/419 |
| 5,650,085 | A * | 7/1997 | Chen | H05B 6/6408 219/732 |
| 5,657,883 | A * | 8/1997 | Badia | A01K 97/10 211/60.1 |
| 5,678,700 | A * | 10/1997 | Crosson, Jr. | A01K 97/10 211/60.1 |
| 5,687,704 | A * | 11/1997 | Lerch | A47J 37/0763 126/25 R |
| 5,826,497 | A * | 10/1998 | Basso | A47J 37/043 99/446 |
| 5,865,889 | A * | 2/1999 | Birtalan | A21C 9/04 118/13 |
| D407,279 | S * | 3/1999 | Tisdale | D7/600.2 |
| 5,887,513 | A * | 3/1999 | Fielding | A47J 37/04 99/419 |
| 5,970,854 | A * | 10/1999 | Tsai | A47J 37/042 99/419 |
| 6,155,162 | A * | 12/2000 | Wang | A47J 37/0694 99/419 |
| 6,250,480 | B1 * | 6/2001 | McGuinness | A47B 81/005 211/70.6 |
| 6,286,418 | B1 * | 9/2001 | Berke | A47J 43/18 452/198 |
| 6,347,577 | B1 * | 2/2002 | Harneit | A47J 37/047 99/419 |
| 6,360,902 | B1 * | 3/2002 | Searles | A01K 97/10 211/70.8 |
| D459,143 | S * | 6/2002 | Pasternak | D7/338 |
| 6,398,045 | B1 * | 6/2002 | Chao | A47F 7/0028 211/181.1 |
| 6,474,224 | B1 * | 11/2002 | Natter | A47J 37/0694 99/419 |
| 6,508,369 | B2 * | 1/2003 | Wang | A47F 7/0028 211/60.1 |
| 6,568,316 | B1 * | 5/2003 | Backus | A47J 37/041 99/419 |
| D482,938 | S * | 12/2003 | Renault | D7/683 |
| D490,273 | S * | 5/2004 | Hockey | D7/600.2 |
| D503,315 | S * | 3/2005 | Lanier | D7/684 |
| 6,929,001 | B2 * | 8/2005 | Yoon | A47J 37/0704 126/25 AA |
| D513,948 | S * | 1/2006 | Martin | D7/600.4 |
| 6,983,854 | B2 * | 1/2006 | Pleiman | B25H 3/04 211/70.6 |
| 7,000,529 | B2 * | 2/2006 | Sculuca | A47J 37/049 99/419 |
| 7,000,785 | B2 * | 2/2006 | Jafari | B01L 9/06 211/60.1 |
| 7,052,059 | B2 * | 5/2006 | Farid | A47J 37/04 294/5 |
| 7,225,730 | B2 * | 6/2007 | Backus | A47J 37/042 99/419 |
| 7,401,409 | B2 * | 7/2008 | Jenkins | A23L 27/00 294/51 |
| D587,076 | S * | 2/2009 | Grady | D7/704 |
| D651,484 | S * | 1/2012 | Zemel | D7/683 |
| 8,110,237 | B2 * | 2/2012 | Smith | A23L 5/13 426/523 |
| D656,344 | S * | 3/2012 | Grimaldi | D6/686 |
| D656,345 | S * | 3/2012 | Grimaldi | D6/686 |
| D682,630 | S * | 5/2013 | Balcerzak | D7/683 |
| D698,607 | S * | 2/2014 | Chen | D7/600.4 |
| D700,017 | S * | 2/2014 | Hertaus | D7/600.4 |
| D706,091 | S * | 6/2014 | DiCosimo | D7/683 |
| 8,845,985 | B2 * | 9/2014 | Herchenbach | B01L 9/06 422/562 |
| 8,881,645 | B2 * | 11/2014 | Balcerzak | A47J 37/0688 99/421 R |
| D740,069 | S * | 10/2015 | Nichols | D7/409 |
| 9,220,366 | B2 * | 12/2015 | Huang | A47J 37/043 |
| 9,282,817 | B2 * | 3/2016 | Yates | A47B 81/005 |
| 9,380,860 | B1 * | 7/2016 | Taylor | A46B 13/008 |
| D763,627 | S * | 8/2016 | Thompson | D7/600.1 |

(56) References Cited

U.S. PATENT DOCUMENTS

| | | | |
|---|---|---|---|
| 9,402,507 B1* | 8/2016 | Prater | A47J 43/20 |
| D776,956 S * | 1/2017 | Ma | D6/552 |
| 9,549,627 B1* | 1/2017 | Grady | A47G 23/0208 |
| D778,684 S * | 2/2017 | Hertaus | D7/600.4 |
| D807,673 S * | 1/2018 | Nakamura | D6/716.4 |
| 10,149,571 B1* | 12/2018 | Tasker | A23L 5/10 |
| D867,073 S * | 11/2019 | McConnell | D7/600.2 |
| D870,519 S * | 12/2019 | Hertaus | D7/600.4 |
| D879,562 S * | 3/2020 | Zhong | D7/600.4 |
| 2002/0018834 A1* | 2/2002 | Vaughan | A47J 37/0704 426/523 |
| 2003/0005828 A1* | 1/2003 | McLemore | A47J 37/1295 99/426 |
| 2003/0019368 A1* | 1/2003 | Backus | A47J 37/042 99/421 H |
| 2004/0164036 A1* | 8/2004 | Cummins | A47B 49/00 211/64 |
| 2005/0194331 A1* | 9/2005 | Chang | A63D 15/10 211/60.1 |
| 2007/0045206 A1* | 3/2007 | Tiemann | A47B 49/00 211/77 |
| 2007/0151465 A1* | 7/2007 | Sculuca | A47J 37/0786 99/419 |
| 2008/0053425 A1* | 3/2008 | Stuhlmacher | A47J 43/18 126/30 |
| 2008/0135038 A1* | 6/2008 | Michel | A47J 37/0718 126/25 A |
| 2011/0017077 A1* | 1/2011 | Magiera | A47J 37/042 99/446 |
| 2011/0113974 A1* | 5/2011 | D'Amato | A47J 37/0786 99/426 |
| 2011/0283892 A1* | 11/2011 | Ikeda | A47J 37/0688 99/419 |
| 2013/0025421 A1* | 1/2013 | Trimarchi | A22C 17/006 83/30 |
| 2013/0247898 A1* | 9/2013 | Balcerzak | A47J 37/0786 126/25 R |
| 2014/0014603 A1* | 1/2014 | Thompson | A47F 5/02 211/78 |
| 2014/0373732 A1* | 12/2014 | Whitfield, Jr. | A47J 43/18 99/419 |

OTHER PUBLICATIONS

Gabbro, Traditional sugar coated snack food at a food stand [online]. Alamy stock photo [retrieved on Dec. 17, 2020]. Retrieved from the Internet: <URL: https://www.alamy.com/stock-photo-traditional-sugar-coated-snack-food-at-a-food-stand-beijing-china-37907556.html>. (Year: 2011).*

Temple fairs in China during Spring Festival [online]. China.org.cn [retrieved on Dec. 17, 2020]. Retrieved from the Internet: <URL: http://www.china.org.cn/environment/health_green_living/2008-02/14/content_1242662.htm>. (Year: 2008).*

Candied fruits (Tanghulu) [online]. Alamy stock photo [retrieved on Dec. 17, 2020]. Retrieved from the Internet: <URL: https://www.alamy.com/candied-fruits-tanghulu-at-one-of-the-renovated-perpendicular-street-image68429548.html?pv=1&stamp=2&imageid=950912FD-5005-4775-96EA-D5CAB8371A72&p=104424&n=0&or>. (Year: 2013).*

* cited by examiner

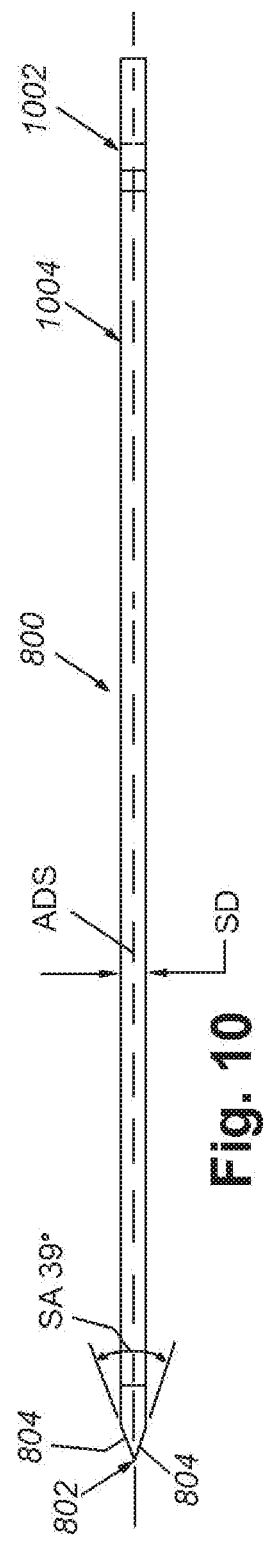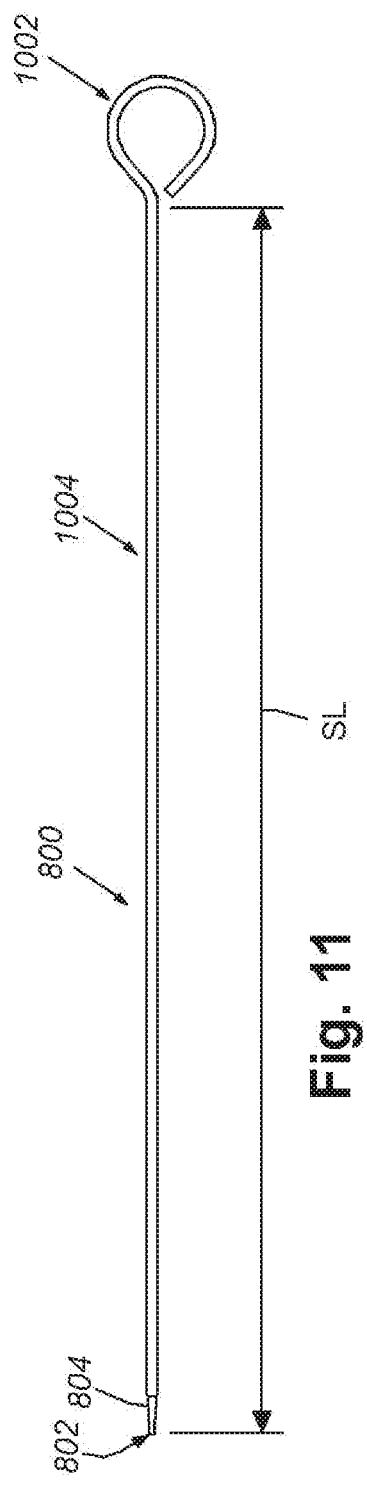

SKEWER HOLDER

RELATED APPLICATIONS

This application is a continuation of co-pending U.S. Patent Application Ser. No. 14/488,180, filed 9/16/2014, entitled SKEWER HOLDER, which application claims the benefit of U.S. Provisional Application Serial No. 61/878,698, filed Sep. 17, 2013,entitled SKEWER HOLDER, the entire disclosure of which is herein incorporated by reference.

FIELD OF THE INVENTION

The present invention relates generally to skewers and more specifically it relates to a holder for skewers.

BACKGROUND OF THE INVENTION

Cooking with skewers is an ancient food preparation method that is practiced worldwide. Many types of food can be prepared on a skewer, including meats, vegetables and fruits. Skewers can provide a quick snack or a full meal. Kebabs are a popular and healthy type of skewered food that is commonly enjoyed from Southern Europe, across the Middle East and the Subcontinent to Southeast Asia. The word 'kebab' is derived from the Arab word 'kabab', meaning to fry. Kebabs can be a mix of one or more of meats, vegetables, fruits and condiments (for example, sauces). One example of this food is a lamb kebab.

Skewers of food products are cooked over or next to a flame source. The proximity to the heat source causes the foods to cook slowly, enhancing the flavor. Traditional kebabs can be prepared in an oven, over a fireplace or in a tandoor style oven. Modern conveniences, such as electric and gas ovens, provide alternatives to the heat source.

Skewers can be fashioned of wood, metal, glass or other heat-resistant materials. Metal skewers are comprised of a long shaft, a handle member and an end point. The user grasps the skewer by the handle, propels the end point into and then through the food product and moves the food along the shaft. This step is repeated until the shaft bears a load of food in the desired amount and with the desired composition. For example, a Turkish kebab includes cloves of garlic, two onions and slices of beef, all spiced and doused with lemon juice. This is then served off the skewer with tzaziki sauce and pita bread.

Conventional metal skewers are generally approximately 10 to 12 inches in length and are formed of 14- and/or 16-guage wire. Other skewers are formed of cut sheet metal with a narrow width and thinness. Skewers can be longer, in the range of 14 to 28 or more. The thicknesses can also vary, greater or lesser. The handle member can be rolled into a ring, bent at a right angle or be provided with a handle of wood, ceramic or other heat resistant material. The end point can be a single point or forked with two or more prongs.

Skewered food is cooked in either a horizontal or a vertical orientation. Conventional modern house ovens lack the height for a proper cooking in the vertical orientation, resulting in the horizontal cooking method for most households. Cooking vertically or horizontally oriented skewers requires a support of some form to maintain each skewer in its orientation and a pan below to catch the drippings. Supports for the skewers can be hangers that engage the handle member and/or end point for a vertical orientation or props that support the skewer near the end point and handle member. A deep rectilinear pan can be a support for an array of horizontally supported kebabs in a row. Each skewer's meat load spans the pan, which in turn catches the juices. Cooking food in a vertical orientation presents advantages over the horizontal cooking method. The horizontal cooking method is one in which each food item is cooked, and its discrete juices mingle slightly with the adjacent items. Gravity pulls the juices off of each piece of the skewer load and they fall into a catch pan beneath. By contrast, in the vertical orientation, the juices flow down the skewer load, mingling as they go and enhancing the overall flavor experience. By the time the juices hit the end point and fall into the pan, they have fully mingled and passed over each food item in turn.

As stated above, horizontal cooking is disadvantageous when compared to vertical orientation cooking. First, the juices co-mingle with adjacent food juices, but do not carry further before dripping into the pan. Second, horizontal cooking requires supports at both ends of the shaft. Third, the resulting foods are not fully flavored because the juices have been limited in their comingling.

It would be desirable to provide a support structure that raises the skewer such that the juices flow down the skewer, mingling and enhancing the flavor as the juices bathe each food item. It would be further desirable to provide a structure that can be placed into conventional ovens so that the skewers are raised above the horizontal orientation and gain the benefits of skewers in a vertical orientation.

SUMMARY OF THE INVENTION

The present invention overcomes the disadvantages of the prior art by providing a system and method for preparing loaded skewers of ingredients that are held in a raised orientation that is sized to fit within a conventional kitchen oven or outdoor grill. A skewer holder for holding skewers is comprised of an upper array of eyelets for receiving and retaining the shaft of a skewer; a lower array of eyelets for receiving and the retaining the shaft of a skewer; a plurality of legs for supporting the upper and lower arrays; and a plurality of support members for supporting the upper and lower arrays. The upper array and lower array are constructed and arranged to retain at least one skewer in an elevated orientation. The elevation angle of the inserted and retained skewers is approximately 60 degrees relative to the horizontal plane, when inserted thru both eyelets; or at 20 degrees when inserted through the upper eyelet only. Illustratively, the eyelets are circular. The skewer holder is constructed and arranged from wire. The skewer holder is provided with three legs. The eyelets are attached to each of the ends of the support members and legs. In an embodiment, the skewer holder is comprised of an upper circular thin plate; a lower circular thin plate; and a plurality of supporting legs. Each of the upper and lower circular thin plates is provided with at least one through-hole for receiving the shaft of a skewer. The upper circular plate is larger in diameter than the lower circular thin plate. The elevation angle of the retained skewers is approximately 60 degrees relative to the horizontal plane. The through-holes are circular. The lower circular thin plate is constructed with at least one stamped rectangular opening. The stamped rectangular opening is provided with a depressed tongue that is bent to receive and retain the point of an inserted skewer. Illustratively, the skewer holder is provided with three legs. The skewer holder comprised a shaft; an eyelet at an end of the shaft; and a point at an end of the shaft that includes two spearpoint blades. The length of the shaft is approximately 9 inches. The angle of the point relative to an axis drawn along the shaft is approximately 39 degrees and can vary between approximately 20 and 40 degrees in various embodiments. A plurality of skewers placed into the upper circular thin plate creates a skewer fan for support of a food article. In various embodiments, a method for cooking a food article can comprise the steps of placing a skewer holder into a pan; inserting a plurality of skewers into a respective through-hole of the upper circular thin plate of the skewer holder so that each of the skewers confronts the upper circular thin plate at the point and is held at an elevated angle of 45 degrees relative to a horizontal axis drawn through the pan to create a skewer fan; placing a food article onto the skewer fan so that the food article is in a vertical orientation relative to a horizontal axis drawn through the pan to create a skewer fan so that it is supported by the skewer fan; putting the pan with the supported skewer holder, skewer fan and food article into an oven; activating the oven to begin heating the oven to a desired temperature; and cooking the food article at the desired temperature for a desired length of time. The food article is a roasting chicken in various embodiments, but a variety of meat and related food products, including ham, turkey, beef roasts, lamb, venison, and the like, can be cooked according to the illustrative method and/or using the skewers and skewer holder of the embodiments herein.

BRIEF DESCRIPTION OF THE DRAWINGS

The invention description below refers to the accompanying drawings, of which:

FIG. 10 is a side view of a skewer, according to an illustrative embodiment; and FIG. 11 is a side view of the illustrative skewer, according to the embodiment.

DETAILED DESCRIPTION

Figure 1:
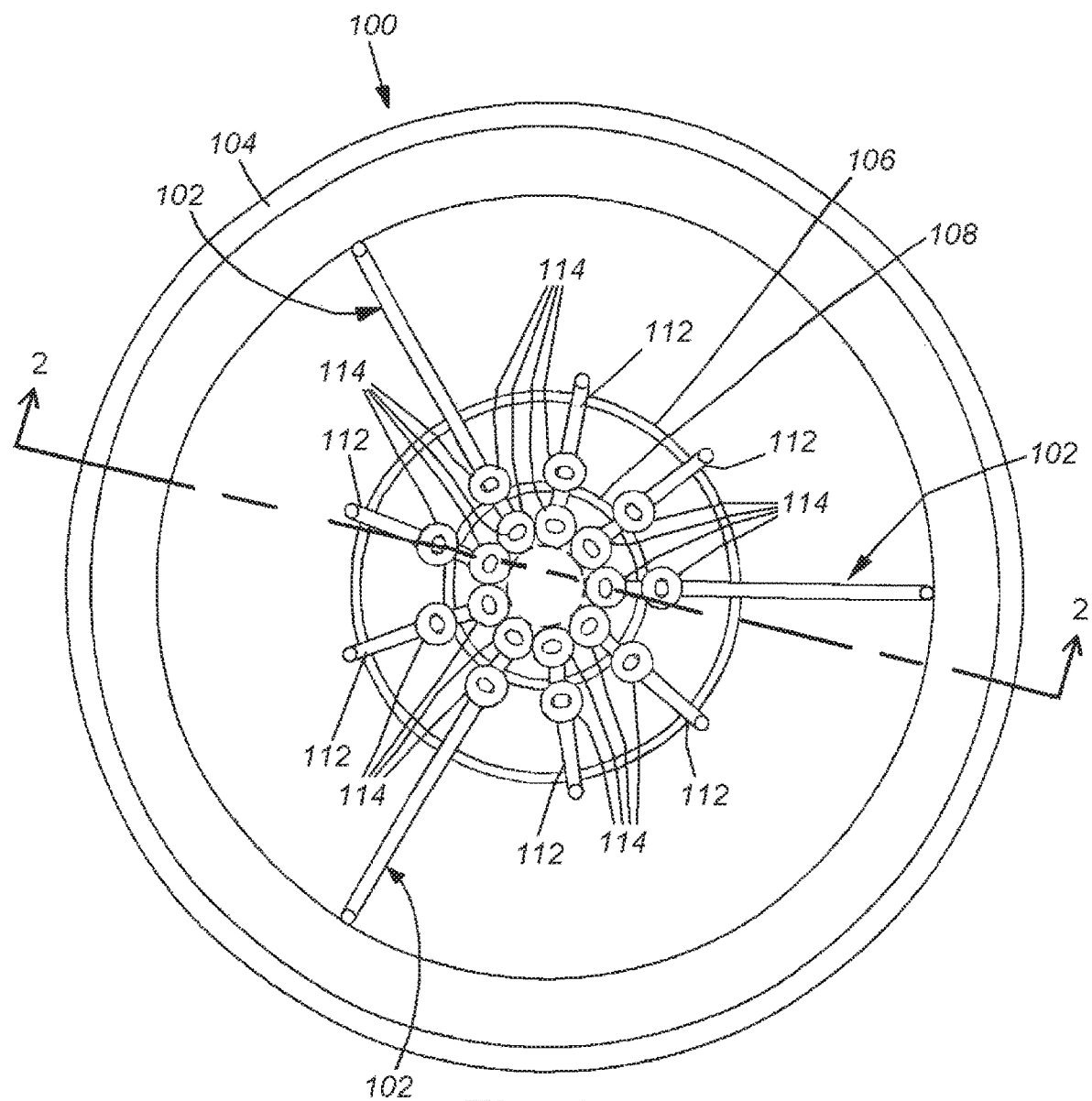
FIG. 1 is top perspective view of a skewer holder, according to a first illustrative embodiment.

A skewer holder system 100 for supporting skewers during the cooking process and afterwards, during the cooling period, and serving preparation is depicted in FIG. 1 in a first illustrative embodiment. The skewer holding system is comprised of a skewer holder 102 and an exemplary pan 104. The pan 104 as shown in FIG. 1 is a commercial 12 inch fry pan. In other embodiments, the pan can be a 12 inch sauté pan, a 12 inch skillet or another cooking pan and the pan can be greater than 12 inches. In further embodiments, the holder system can be sized smaller for smaller pans. The materials used for the construction of the holder can be a steel product or another suitable material, with or without a coating. The coating can be a ceramic product, a metal (for example, chrome), a synthetic material (for example, a polymer product) or a process (for example, stainless steel).

An illustrative skewer holder 102 is constructed and arranged for holding nine skewers. It is expressly contemplated that the skewer holder can be constructed to hold more or less skewers as appropriate to the size and arrangement of the assembly. The skewer holder 102 is provided with two support rings, an outer support ring 106 and an inner support ring 108. The rings 106, 108 are maintained in their respective positions by a plurality of support members 112 and legs 110 that are connected to each other via welds, stamping, brazing or another attachment mechanism. The diameter of the wider outer ring 106 is approximately 4.8 inches in an embodiment and the diameter of the narrower inner ring 108 is approximately 3.6 inches. The skewer holder 102 can be sized to fit within a pan having a diameter of eight, ten or 12 inches (approximately 200 mm, 250 mm and 300 mm), or of greater or lesser diameter. The overall weight of the holder is approximately one half pound (approximately 250 grams), depending on the thickness of the component materials and overall size. It is contemplated that these diameters can be larger or smaller in other embodiments. The rings 106, 108 are set upon the respective support members 112. Both the support members 112 and legs 110 are bent so that they extend outwards towards the walls of the pan and fold back towards the center. The legs 110 provide stability for the skewer holder 102. The legs 110, support members 112, inner and outer rings 106, 108 are constructed of chrome covered wire and are tack-welded together in the illustrative embodiment. In other embodiments, the wire can be coated with a powder coating, a ceramic, or a non-stick coating (e.g. Teflon). The eyelets 114 are aligned so as to receive the skewer (not shown). Each of the upper and lower arrays is constructed to receive and retain at least one skewer. It is expressly contemplated that the eyelets can be formed of flat disks that are provided with a through-hole sized and constructed to accommodate a skewer shaft (for example, a commercial metal washer). The skewer holder stores easily with a small volume of cabinet, hanging rack and/or shelf space.

As set forth herein, the terms "rear" and "rearward" are each defined as a direction opposite "front" and "forward". "Up" and "upward" are each defined as a direction taken from the base and toward the gate with "top" being at the approximate maximum point, "down" and "downward" are each defined as a direction taken from the gate and toward the base with "bottom" being at the approximate maximum point. "Inner" is defined as a region or surface oriented towards the center of the skewer holder or pan, while "outer" is defined as a region, direction or surface facing away from the center of the skewer holder or pan and exposed to the outside environment. More generally, as used herein the directional terms, such as, but not limited to, "up" and "down", "top" and "bottom", "inside" and "outer", "front" and "back", "inner " and "outer", "interior" and "exterior", "downward" and "upward", "horizontal" and "vertical" should be taken as relative conventions only, rather than absolute indications of orientation or direction with respect to an acting direction of the force of gravity.

Each of the respective support members 112 and legs 110 is provided with two mounting eyelets 114, one of which is oriented at or near the inner ring 108. The second eyelet is located at the inner end of the respective support member and leg. This ensures that each skewer is positively supported at (at least) two remotely positioned points along its length.

Figure 2:
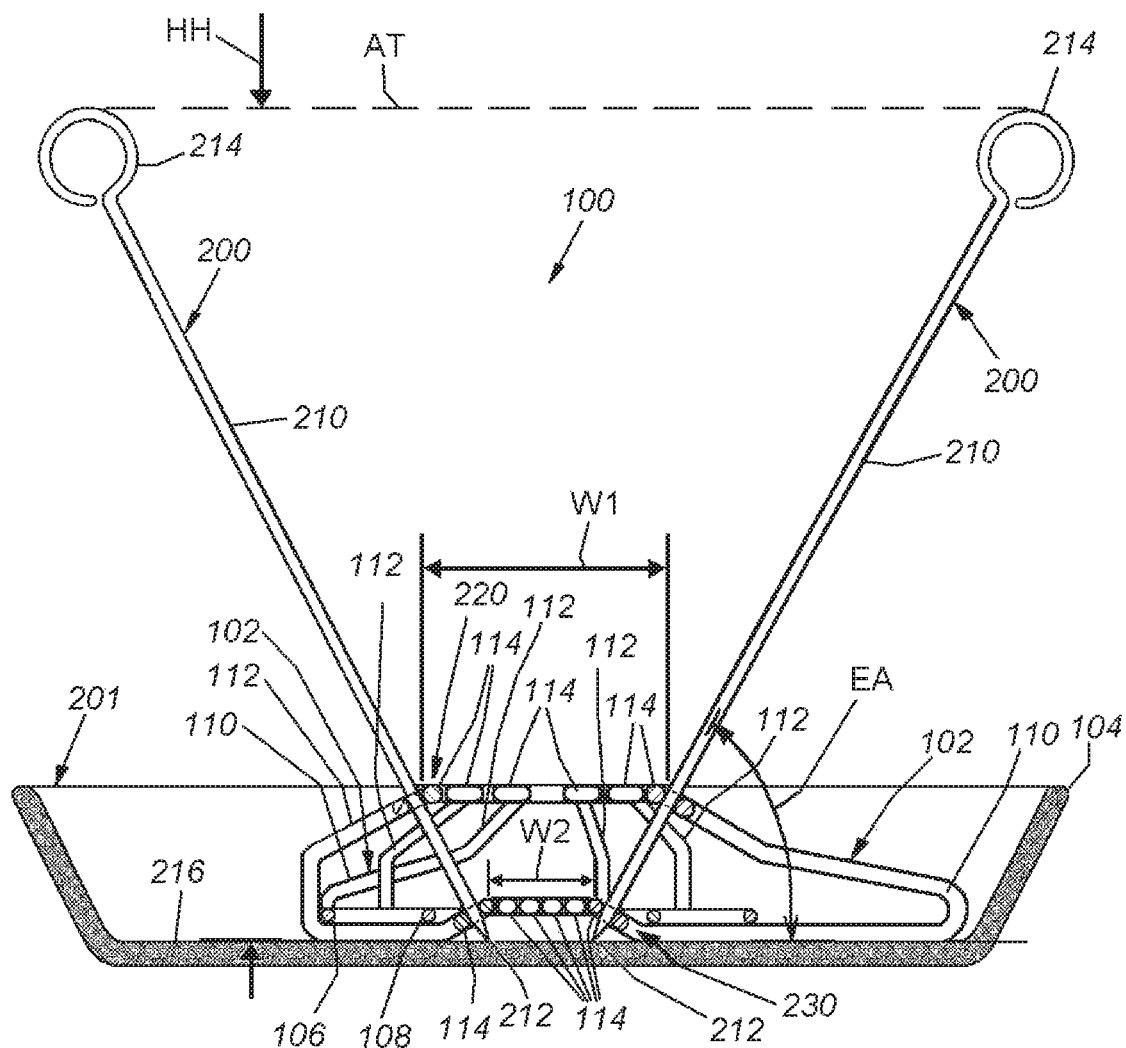
FIG. 2 is a cross-section view of a skewer holder alone lines 2-2 of FIG. 1, according to the first embodiment.

FIG. 2 is a cross-section view of the skewer holder system 100 with inserted skewers 200 residing in (removably mounted in) a pan 201. The exemplary skewers are constructed and arranged to be provided with a shaft 210, a point 212 and a handle ring 214. In other embodiments, the skewer handle is a bent portion, a knob or is a straight terminus for the shaft. The thickness of the exemplary skewer shaft 210 is approximately 0.12 inches (3 mm). The length of the exemplary skewer is between 10 and 12 inches (approximately 250 and 300 mm). The point 212 can be constructed as a frustoconical section, a point with two or more flattened faces having a cross-section that is rectilinear, triangular or square in profile. The eyelets 114 are discrete and of the same gauge of wire as the holder. Each eyelet 114 is sized according to the thickness of the skewers so that the inner diameter of the eyelet is greater than the outer diameter of the respective skewer shaft. It is contemplated that thicker skewer shafts will result in correspondingly larger eyelets. Each eyelet is aligned so as to receive the skewer shaft and hold the skewer in an elevated orientation at an elevated angle EA of approximately 60 degrees relative to the horizontal plane. Given skewers of 12 inches (approximately 300 mm) length at an orientation of 60 degrees, the resultant height HH of the skewers 200 in the skewer holder 102 is approximately 10 inches (approximately 250 mm), from the pan bottom 216 to the axis of the tops AT of the skewers. The eyelets 114 are disposed so that there is an upper array 220 and a lower array 230, each of nine eyelets. In other embodiments having more or less pairs of eyelets, the number of eyelets in each array will be less or greater. The top of the upper array 220 is situated approximately at the top 201 of the pan 104 in the illustrative embodiment, but the pan can be provided with a greater or lesser depth. The distance W1 between opposing upper array eyelets 114 is approximately 3 inches (76 mm). The distance W2 between opposing lower array eyelets is approximately 1 inch (25 mm). In other embodiments, the skewer holder can be constructed with eyelets positioned so that the elevated angle EA can be as low as 45 degrees or as high as 80 degrees, relative to the horizontal plane.

Figure 2A:
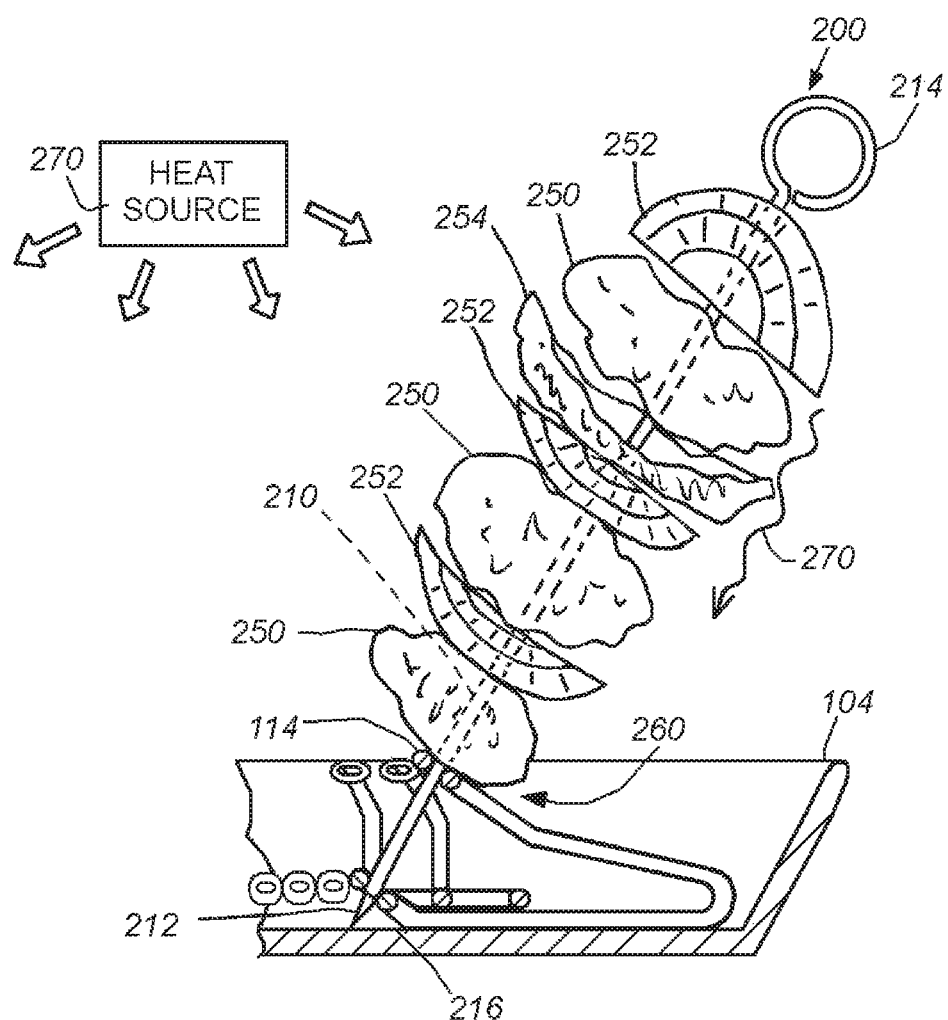
FIG. 2A is a cross-section view of a skewer holder of FIG. 2 loaded with kebab foods, according to the first embodiment.

FIG. 2A is a view of a portion of FIG. 2 with an illustrative skewer 200 loaded with food, for example, meat cuts 250, onion slices 252 and peppers 254. A loaded skewer is a skewer upon which food is placed for cooking purposes. The lowest food portion 260 rests against the eyelet 114. The point 212 rests upon the pan bottom 216. When skewers are loaded with food portions and are placed into the skewer holders, the skewer holder becomes a "loaded" skewer holder. The loaded skewer holder can be placed into an oven. The oven is activated and heats up, so that the heat source 270 radiates heat within the oven, and begins cooking the skewered food. The cooking causes the juices within the food to cook and liquefy. A downward flow 270 of the liquid juices begins, transporting liquid fats, sauces and other fluids downward along successive food portions to the pan bottom. In another embodiment, additional uncooked vegetables can be placed into the pan prior to cooking so that as the juices accumulate in the pan, they flavor those vegetables.

Figure 3:
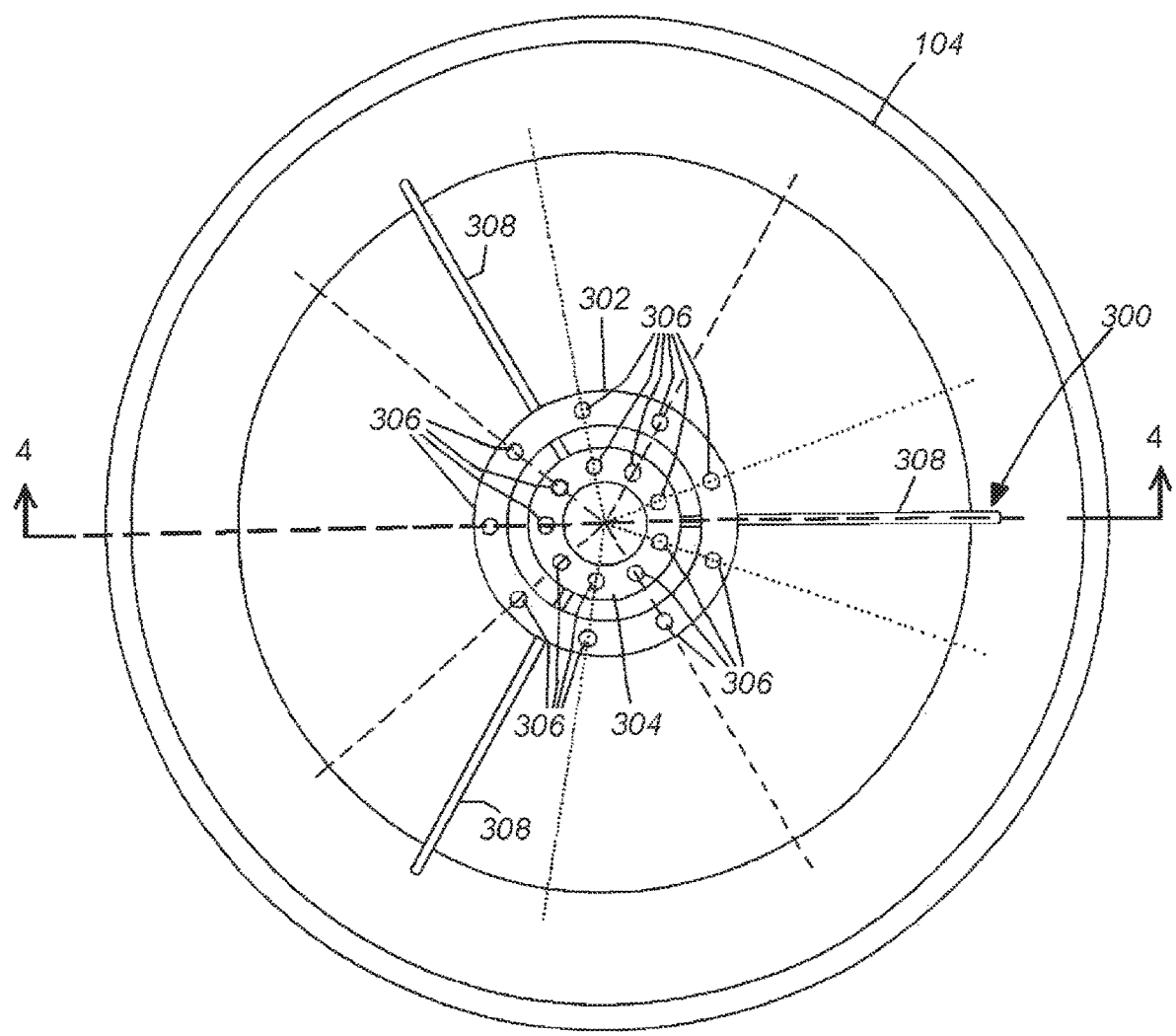
FIG. 3 is top perspective view of a skewer holder, according to a second illustrative embodiment.

In a second embodiment, the eyelets are formed within two concentric thin circular plates and the support members of FIGS. 1-2A are not present. In FIG. 3, the skewer holder 300 is sized and arranged to reside within a pan 104. The skewer holder 300 is comprised of a plurality of legs 308 and two concentric thin circular plates 302, 304, each of which is provided with through-holes 306 that serve as eyelets for inserted skewers. The concentric thin circular plates 302, 304 are constructed and arranged so that the inserted skewers first pass through the outer plate 302 before passing into the inner plate 304. The alignment and positioning of the plates 302, 304 is configured so as to position each skewer in a raised orientation. The wider outer plate 302 is situated above the narrower inner plate 304. The support for skewer holder 300 is provided by the legs 308. The construction of the skewer holder 300 is simpler than the construction of skewer holder 102, with fewer parts and connection points and can be manufactured more efficiently at a lower cost.

Figure 4:
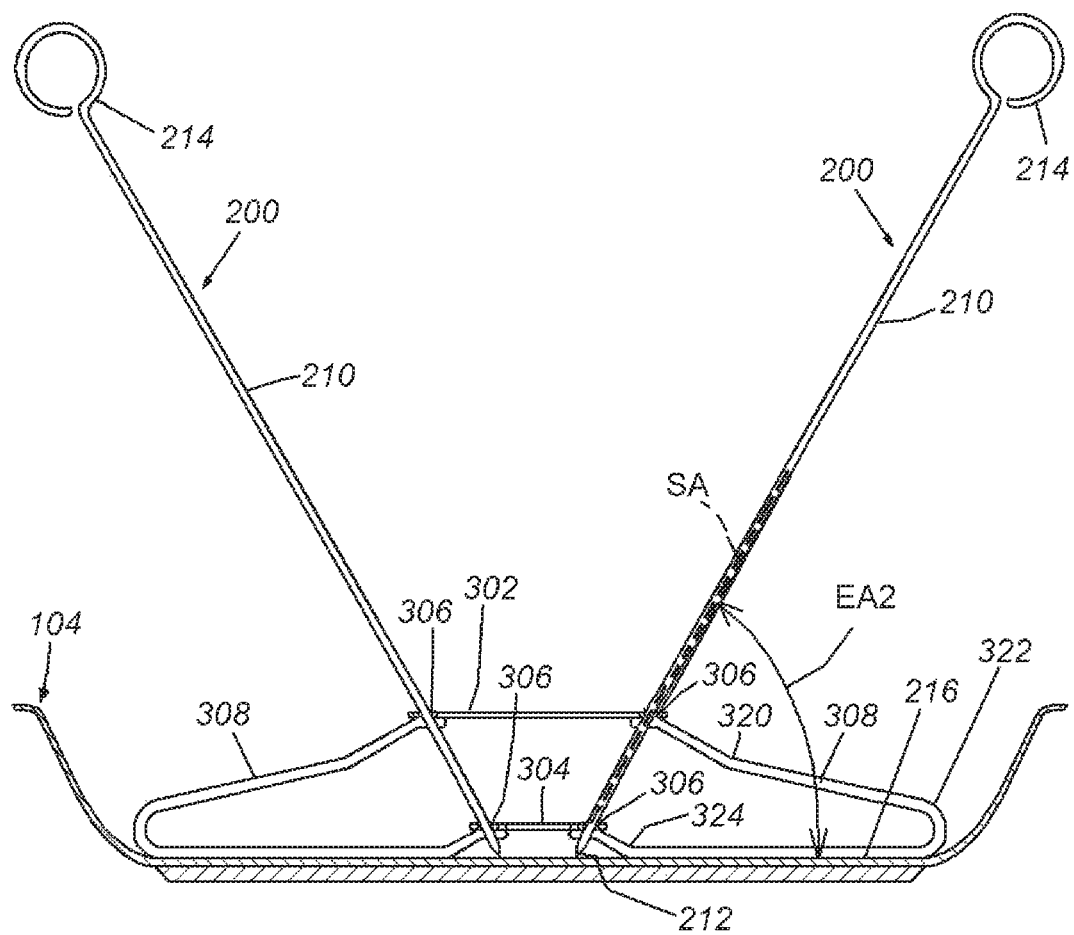
FIG. 4 is a cross-section view of a skewer holder alone lines 4-4 of FIG. 3, according to the second illustrative embodiment.

FIG. 4 is a cross-section of the skewer holder 300 of FIG. 3, with two exemplary skewers 200 depicted as having their respective shafts 210 residing in the corresponding eyelets 306. The legs 308 are constructed so as to be provided with one of the thin circular plates 302, 304 attached to each end and are folded so as to have bends 320, 324 and a rolled fold 322. The rolled fold 322 of each of the legs is arranged to fit with a pan 104 and provide stability. It is contemplated that a skewer holder can be provided with a plurality of more than three legs. The leg bends 320, 324 elevate their respective plates 302, 304 so that the points 212 have passed through the eyelets 306 of the inner plate 304 before making contact with the inner surface 216 of the pan 104 and the skewer 200 is in an elevated configuration. The elevated angle EA2 of the elevated configuration is the difference between the horizontal plane and an axis SA through the shaft 210 of the skewer 200 and is approximately 60 degrees.

Figure 5:
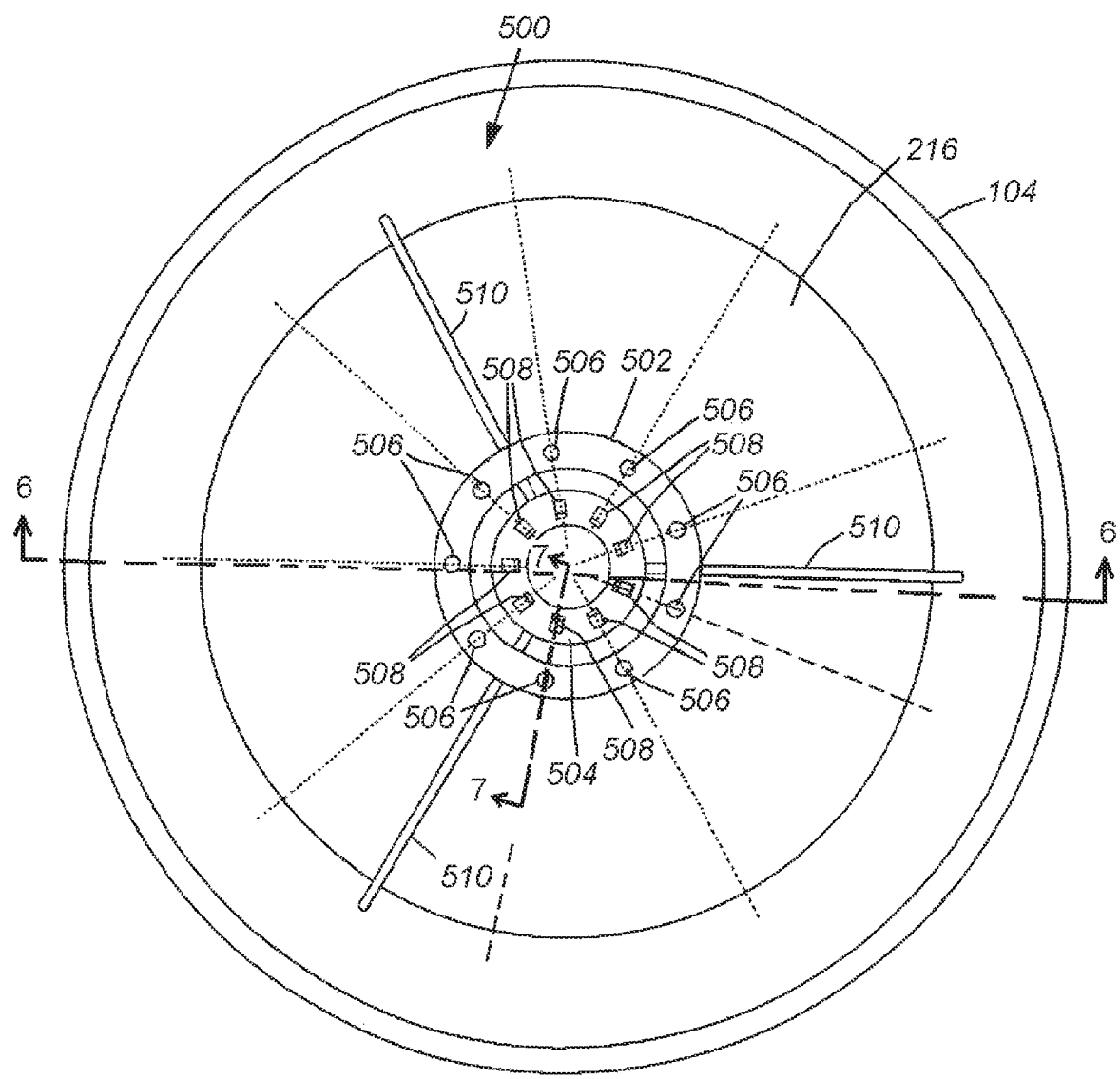
FIG. 5 is top perspective view of a skewer holder, according to a third illustrative embodiment.
Figure 6:
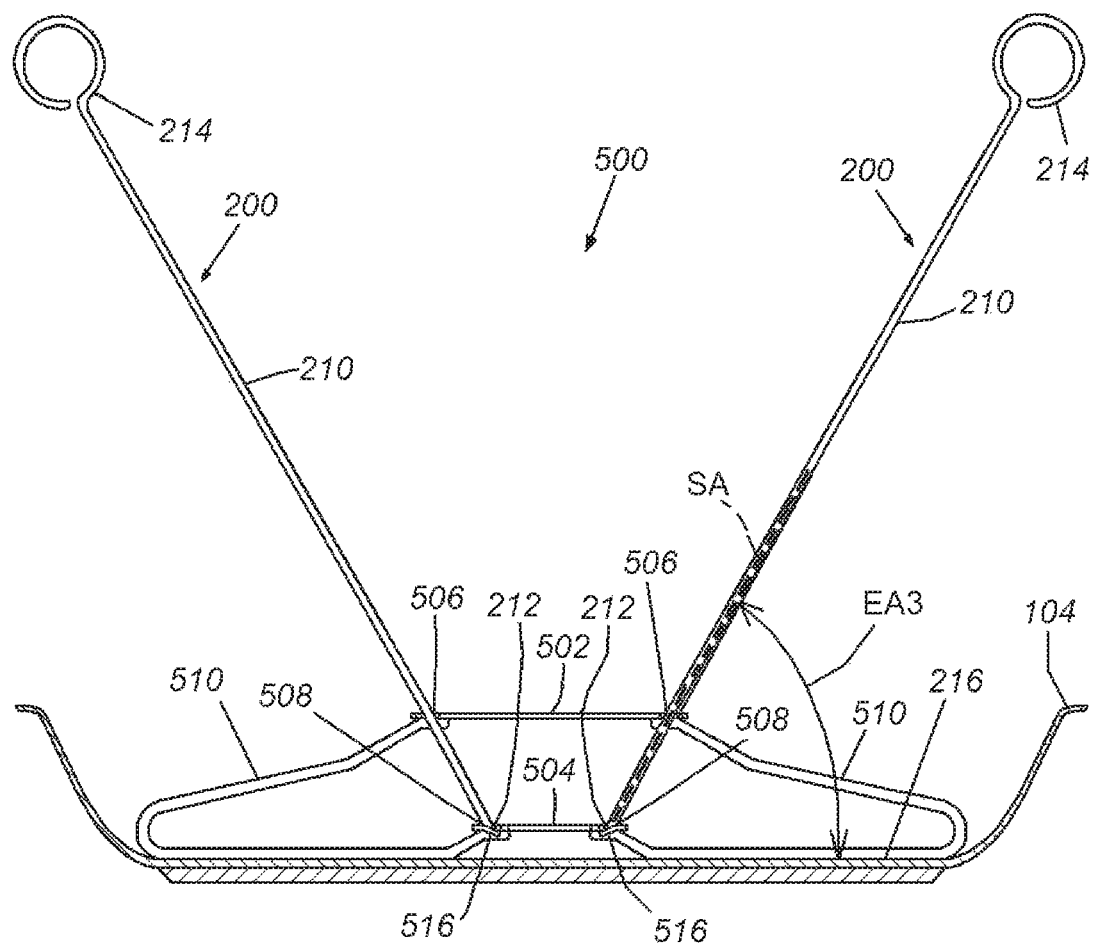
FIG. 6 is a cross-section view of a skewer holder alone lines 6-6 of FIG. 5, according to the third illustrative embodiment.
Figure 7:
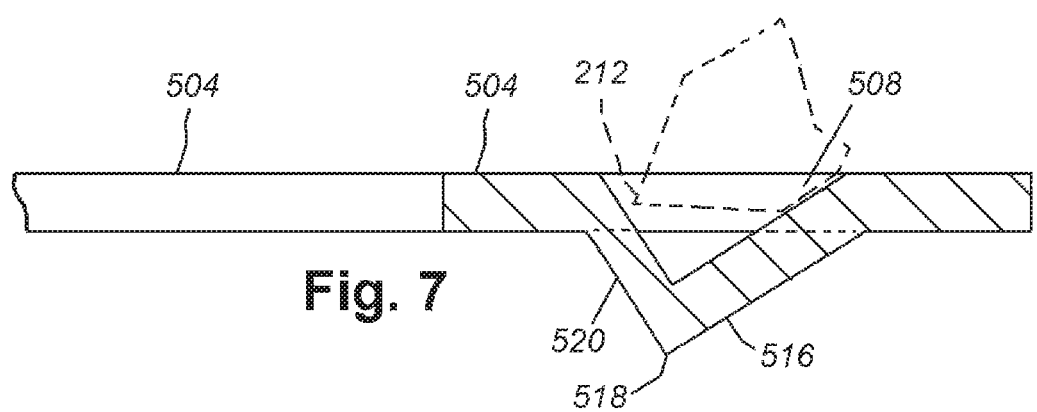
FIG. 7 is a partial cross-section of a skewer holder alone lines 7-7 of FIG. 5, according to the third illustrative embodiment.

A third embodiment of the skewer holder is shown in FIGS. 5-7 and is a skewer holder 500 that is constructed so that the points of each inserted skewer do not make contact with the inner surface of the pan. The skewer holder 500 is constructed with a plurality of at least three legs 510 and two concentric thin plates 502, 504. The upper and outer plate 502 is provided with a plurality of circular through-holes 506 that serve as eyelets. The inner and lower plate 504 is provided with a plurality of stamped/punched holes 508 that are rectangular in shape and serve as recessed eyelets and support rests for the skewer points. Skewer holder 500 is depicted as accommodating up to nine sewers. In other embodiments, there can be accommodation for more or less skewers.

FIG. 6 is a cross-section of skewer holder 500 of FIG. 5 and shows that the respective points 212 of each skewer 200 is elevated above the inner surface 216 of the pan 104. Insertion of the skewers 200 is accomplished by passing each point 212 through the eyelets 506 of the upper and outer plate 502 and into the stamped eyelet hole 508 of the lower and inner plate 504. The stamping process that forms the eyelet holes 508 creates a tongue 516 that serves as a resting place for each point 212 and elevates the points above the pan inner surface 216. Each of the legs 510 is constructed with geometry similar to legs 308 above and be provided with plates 502, 504 affixed at their ends. The resultant elevated angle EA3 of the elevated configuration of the skewers is the difference between the horizontal plane and an axis SA through the shaft 210 of the skewer 200 and is approximately 60 degree.

An illustrative stamped eyelet hole 508 of FIG. 5 is shown in greater detail in FIG. 7. As set forth above, the stamping process creates a tongue 516 having a bend 518 that creates a resting wall 518 for a skewer point 212.

Figure 8:
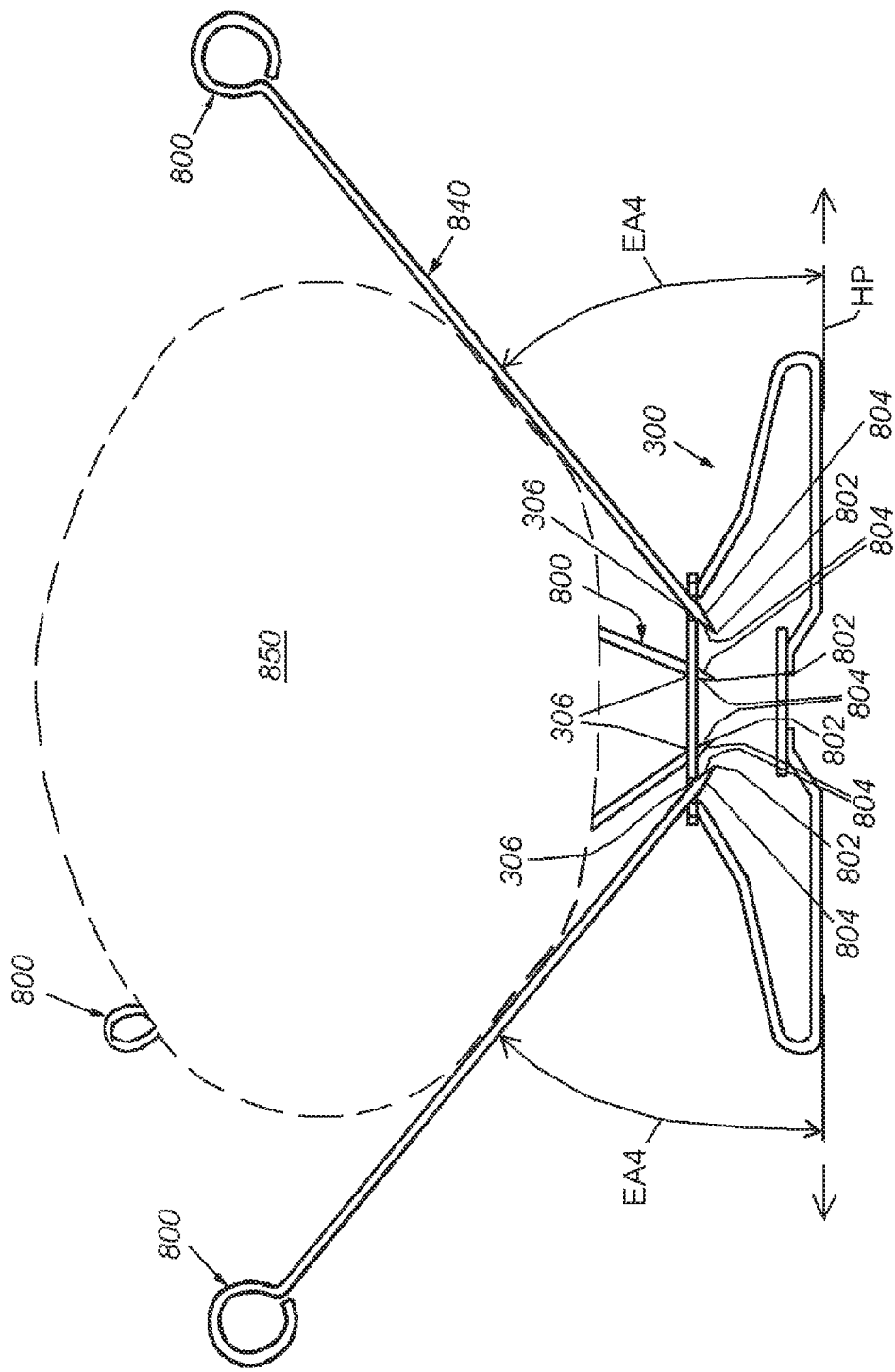
FIG. 8 is a side view of a skewer holder, according to an illustrative embodiment.
Figure 9:
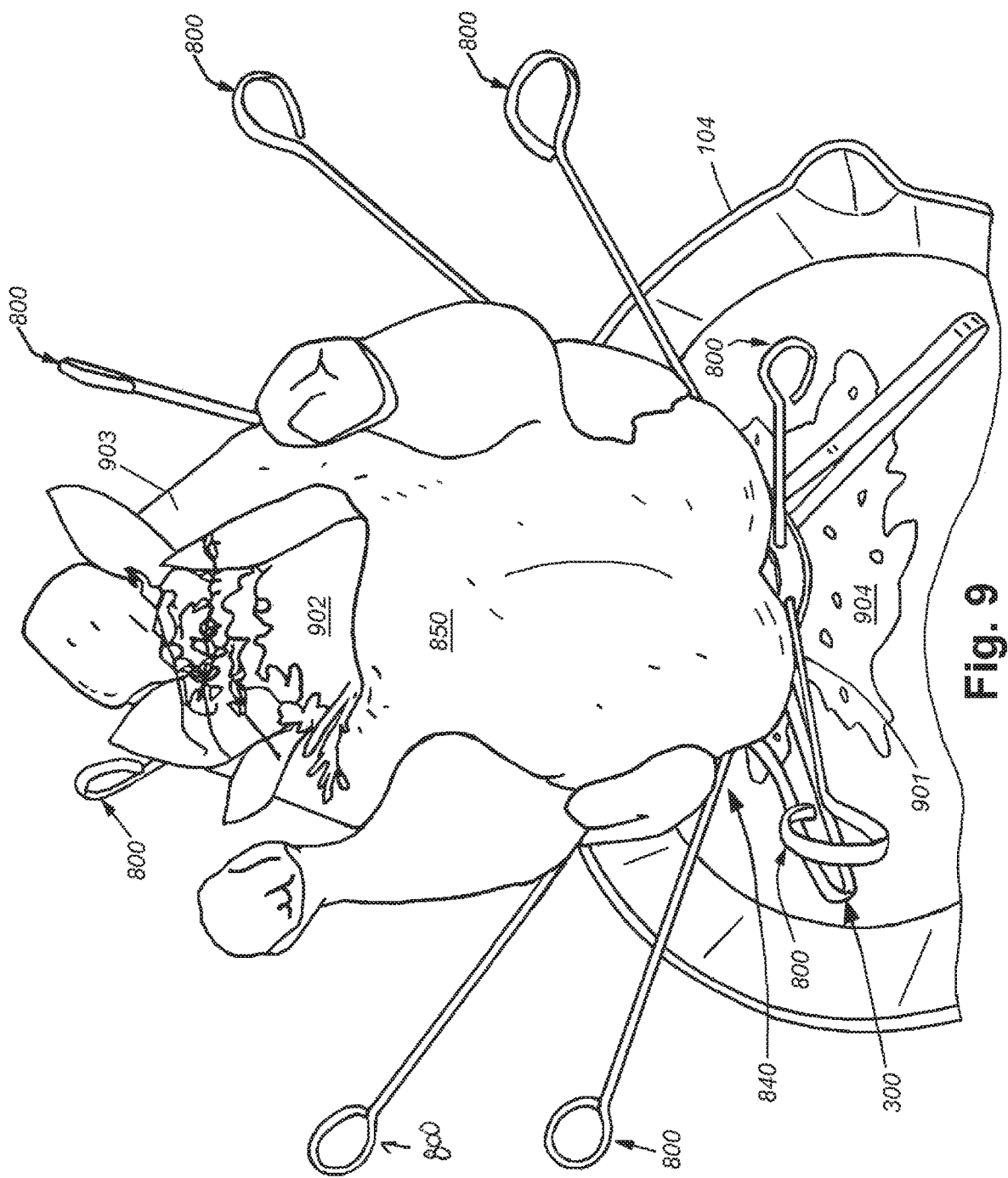
FIG. 9 is a perspective view of a skewer holder, according to an illustrative embodiment, shown for use as a support rack in an illustrative method of cooking a food product, such as a roasting chicken.

FIG. 8 depicts an array of skewers 800 engaged with the skewer holder 300 of FIGS. 3 and 4 above. In an embodiment, each skewer 800 has been inserted into a through-hole 306 such that a skewer point 802 is in contact with a through-hole 306 along the spearpoint blades 804 of the skewer. This orientation results in the skewers 800 resting at a lower elevated angle EA4 of approximately 45 degrees relative to the horizontal plane (HP) drawn along the bottom of the skewer holder 300. When a plurality of skewers 800 are engaged with the skewer holder 300 in this manner, a support structure 840 comprised of skewers is created that can support a food article 850. The support structure 840 is a temporary structure. This support structure 840 can also be termed a "skewer fan". The food article 850 is being propped up and supported by the skewer fan 840, so that it is prevented from tipping and maintains an upright orientation (as shown in FIG. 9). In an illustrative embodiment, the food article 850 is a chicken. In other embodiments, the food article 850 can be a duck, goose, small turkey, roast of lamb, roast of pork, roast of beef, venison, or other like food article (including various large-scale vegetables, such as stuffed eggplant, zucchini, etc.

FIG. 9 depicts the skewer fan 840 supporting a food article 850. In the illustrative embodiment, the food article 850 is a whole chicken that is filled with spices and vegetables 902. The chicken is oriented upright and positioned with the neck 901 down and the tail 903 above the neck. Commercially available chickens that have been dressed for roasting physically possess a smaller aperture opening into the body cavity at the neck 901 than at the tail 903, so that the body cavity can be used as an open topped vessel to hold and contain vegetables and spices 902 during the cooking process. The inserted vegetable and spice mixture 902 cooks within the chicken, co-mingling flavors and juices with the chicken and enhancing the flavors of both. The chicken of FIG. 9 resides upon a skewer fan 840 arranged on a skewer holder 300 that is in turn situated in a cooking pan 104. The pan 104 catches the juice runoff 904 from the chicken.

The chicken of FIG. 9 is propped by the skewer fan 840 above the pan 104 so that the chicken is elevated above and not in contact with the pan 104. In a conventional commercial oven, the upper portion of the oven space is heated to a higher temperature than the center of the oven, or the bottom. A chicken placed into an oven to roast heats at uneven rates. The denser, more muscular thighs heat relatively slowly, while the less dense chicken breast heats more rapidly. Thus, the thighs take longer to cook than the breast, and in a chicken placed onto a conventional pan, the breast meat can become overcooked and relatively dry in taste by the time the thighs are properly cooked. This unacceptable result can be avoided when the chicken is placed into a raised vertical orientation, upside down, so that the thighs are at the top and the breast is lower. Given that the uppermost region of a conventional home oven is hotter than the lower regions, placing the thighs in the hotter uppermost region and the breast in the relatively cooler lower region provides a more even cooking, and a juicier result for the breast. Moreover, the fatty tissue within the chicken tends to liquefy during cooking. Liquid fats are subject to gravity and flow downwards, pooling in the breast region and creating a result that is moister, juicier and more flavorful than a conventionally roasted chicken. The increased flavor and juiciness of a chicken roasted in this fashion is an unexpected result that works in all conventional ovens and convection ovens. Another result of cooking a chicken propped up by the skewer fan 840 is that the skin of the chicken browns evenly and crisply.

An illustrative skewer 800 is shown in FIGS. 10 and 11. With regard to FIG. 10, the skewer 800 is comprised of an eyelet 1002, a shaft 1004 and a point 802. The point 802 is provided with a spearpoint blade 804. The angle SA of the spearpoint blade is approximately 39 degrees relative to an axis AOS drawn longitudinally along the skewer 800. The angle SA can vary—for example between approximately 25 and 30 degrees. The shaft diameter SD is approximately 4.8 mm (0.19 inches). In an embodiment, the diameter of the holes 304 on the narrower inner plate is less than the shaft diameter SD and captures the point 802 along the spearpoint blade 804 so that the point 802 does not come into contact with the pan. If the point 802 is in contact with the pan, then heat is transferred from the pan along the shaft. Removing the skewer 800 from direct contact with the pan reduces the amount of heat transferred from the skewer 800 to the food article 850 and promotes cooking from the exterior of the food article to the interior, without additional heating radiating from the skewer to the interior of the food article.

The skewer 800 of FIG. 10 is shown from another perspective in FIG. 11, such that the eyelet 1002 is visible. The shaft length SL is shown as approximately 228 mm (9 inches). In other embodiments, the shaft length SL can be greater or lesser. Given the interior geometry and dimensions of the conventional oven, the 9 inch shaft length is long enough to create a fan skewer as set forth in FIG. 8 above, or the more vertical orientation of skewers ad shown in FIG. 2.

It should be clear that the skewer holding system according to various embodiments described herein provides a superior device that elevates the skewers so that the food products held by the skewers is more fully infused with the full range of available flavors and juices, including fats and other flavors, as those juices evenly pass down the skewer.

The foregoing has been a detailed description of the illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, the attachment of the parts of the skewer holder can by riveting, braising, wrapping or another attachment. The exterior surface of the holder can be chrome plated; powder coated or treated with another treatment to resist rust and deterioration, for example, a ceramic coating. In other embodiments, the holder can be constructed using stainless steel or another heat-resistant metal, such as aluminum. The eyelets can be squared, star-shaped or have another geometry. Where the term approximately is employed, it generally allows for variation of angle by 1 to two degrees and variation of length by a fraction of an inch, or greater, as appropriate. Accordingly, this description is meant to be taken only by way of example, and not to otherwise limit the scope of this invention.

What is claimed is:

1. A skewer system for cooking food comprising:
a skewer holder having an upper plate defining upper holes and a lower plate defining a plurality of eyelet holes, the upper plate and the lower plate being concentric, and the lower plate having a plurality of tongues corresponding to and positioned below the plurality of eyelet holes, the plurality of tongues respectively defining a plurality of bends that respectively create a plurality of resting walls;
at least three support members interconnecting the upper plate and the lower plate, the support members each defining a leg that is adapted to engage a surface of a pan; and
a plurality of skewers removably insertable into the upper holes and the plurality of eyelet holes and configured to respectively rest against the plurality of resting walls to form a skewer fan, the skewers defining a frustoconical volume within the skewer fan.

2. The skewer system of claim 1, wherein the skewers are at an angle in a range between 45 degrees and 80 degrees from horizontal.

3. The skewer system of claim 1, wherein the skewers are at an angle of 45 degrees from horizontal.

4. The skewer system of claim 1, wherein the skewers are at an angle in a range between 45 degrees and 80 degrees from horizontal.

5. The skewer system of claim 1, wherein the skewers are at an angle of 60 degrees from horizontal.

6. A system for cooking food comprising:
a skewer holder having an upper plate defining upper holes and a lower plate defining a plurality of eyelet holes, the upper plate and the lower plate being concentric, and the lower plate having a plurality of tongues corresponding to and positioned below the plurality of eyelet holes, the plurality of tongues respectively defining a plurality of bends that respectively create a plurality of resting walls;
a plurality of skewers removably insertable into the upper holes and the plurality of eyelet holes and configured to respectively rest against the plurality of resting walls to form a skewer fan, the skewers defining a frustoconical volume within the skewer fan;
and a pan configured to support the skewer holder such that a lower point of each of the plurality of skewers is elevated above a pan inner surface; and
at least three support members interconnecting the upper plate and the lower plate, the support members each defining a leg that is adapted to engage the inner surface of the pan.

7. The skewer system of claim 1 wherein the support members define wires that are shaped to extend downwardly from the upper plate to the lower plate, and whence to the surface of the pan, then outward along the surface and are folded to extend upwardly and inwardly toward a center of the system.

8. The skewer system of claim 7 wherein the support members are folded upwardly and inwardly inside walls of the pan.

9. The skewer system of claim 6 wherein the support members define wires that are shaped to extend downwardly from the upper plate to the lower plate, and whence to the surface of the pan, then outward along the surface and are folded to extend upwardly and inwardly toward a center of the system.

10. The skewer system of claim 9 wherein the support members are folded upwardly and inwardly inside walls of the pan.

* * * * *